United States Patent
Lickfelt

(10) Patent No.: US 8,626,357 B1
(45) Date of Patent: Jan. 7, 2014

(54) METHOD TO CHANGE DRIVER IDENTIFICATION FOR PASSIVE ENTRY VEHICLE

(71) Applicant: Honda Motor Co., Ltd., Tokyo (JP)

(72) Inventor: Brian K. Lickfelt, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/709,276

(22) Filed: Dec. 10, 2012

(51) Int. Cl.
*G08B 13/14* (2006.01)

(52) U.S. Cl.
USPC .................. 701/2; 701/49; 340/5.2; 340/5.72

(58) Field of Classification Search
USPC ............. 701/2, 36, 45, 49, 48; 340/5.2, 5.31, 340/5.1, 5.61, 5.65, 5.72, 5.64, 10.2
See application file for complete search history.

(56) References Cited

U.S. PATENT DOCUMENTS

| | | | |
|---|---|---|---|
| 6,759,943 B2 | 7/2004 | Lucy et al. | |
| 6,768,413 B1 * | 7/2004 | Kemmann et al. | 340/5.72 |
| 7,050,795 B2 | 5/2006 | Wiegand et al. | |
| 7,109,843 B2 | 9/2006 | Nagai et al. | |
| 7,916,021 B2 | 3/2011 | Lickfelt et al. | |
| 8,089,343 B2 * | 1/2012 | Yamaguchi et al. | 340/5.72 |
| 2007/0290554 A1 | 12/2007 | Teshima et al. | |
| 2010/0073153 A1 | 3/2010 | Yamaguchi et al. | |

* cited by examiner

*Primary Examiner* — Richard Camby
(74) *Attorney, Agent, or Firm* — Rankin, Hill & Clark LLP

(57) ABSTRACT

A method for applying driver preference settings for a vehicle includes transmitting an exterior signal from at least one closure antenna. The method further includes determining whether a valid response signal was received in response to the transmitted exterior search signal. The valid response signal includes a respective ID code unique to a fob that transmitted the valid response signal. Upon determining that a valid response signal was received, the method further includes determining whether a door switch flag allows for changing of a driver preference setting. Upon determining that the door switch flag allows for changing the driver preference setting, the method includes assigning the driver preference setting based on the respective ID code in the received response signal. The assigned driver preference setting includes at least one of a vehicle seat setting, a rearview mirror setting, a side view mirror setting, a radio station setting, and an HVAC setting.

20 Claims, 3 Drawing Sheets

METHOD TO CHANGE DRIVER IDENTIFICATION FOR PASSIVE ENTRY VEHICLE

BACKGROUND

The present disclosure is related to a wireless passive entry system for a motor vehicle. More particularly, this disclosure is related to a method to change driver identification for a passive entry vehicle.

In today's cars it is somewhat standard to have a specific key fob for a specific driver. In the vehicle, each fob is "tied" to potentially many functions and driver preference settings (e.g., radio presets, driver positioning, mirror positioning, and the like). In known passive entry systems, the driver preference settings are usually based on a fob identification found in a signal from the fob which allows entry into the vehicle.

The current trend is to apply four-door passive entry to vehicles. With four-door passive entry, when the handle on the driver's door is grabbed, generally only the driver's door unlocks. When other points of access (e.g., passengers' doors and a tailgate) are triggered, all doors of the vehicle unlock. With four-door passive entry, the probability increases that the driver may keep his or her fob in their briefcase or bag, for example, and place the briefcase or bag in a rear seat of a vehicle by first opening a rear door or the tailgate. With current passive entry systems, the driver preference settings would not be changed if the driver accessed the vehicle through a point of access other than the driver's door and placed the briefcase or bag, in which the fob is located, in the rear of the vehicle. With current passive entry systems, the driver identification would default to the previous values set at the last grab of the driver's door handle with a valid key fob. This can create confusion and frustration for the driver of the vehicle.

For example, a husband and wife own and share a vehicle equipped with four-door passive entry. The wife typically drives the vehicle during the day and keeps her fob in her purse. The husband then takes the vehicle on some evenings and keeps his fob in his backpack. If the husband puts his backpack in the cargo area by first opening the tailgate, the identification for the husband can be confused because the vehicle only recalls the identification of the wife, who was the last driver to grab of the front door handle carrying a valid key fob. Because the husband placed his backpack in the cargo area, there was no fob identification present at the driver's door handle when the husband entered the vehicle though the driver's door. As such, even though the wife is not operating the vehicle, the driver preference settings are set for the wife and not the husband.

SUMMARY

A method for applying driver preference settings for a vehicle is disclosed. The vehicle includes a plurality of closures and a plurality of antennas. The plurality of closures includes a driver's door and at least one other closure mentioned above. The plurality of antennas includes a driver's door antenna associated with the driver's door and at least one other closure antenna associated with the at least one other closure. The method includes transmitting an exterior signal from the at least one other closure antenna. The method further includes determining whether a valid response signal was received in response to the transmitted exterior search signal. The valid response signal includes a respective ID code unique to a fob that transmitted the valid response signal.

Upon determining that a valid response signal was received, the method further includes determining whether a door switch flag allows for changing of a driver preference setting. Upon determining that the door switch flag allows for changing the driver preference setting, the method includes assigning the driver preference setting based on the respective ID code in the received response signal. The assigned driver preference setting includes at least one of a vehicle seat setting, a rearview mirror setting, a side view mirror setting, a radio station setting, and an HVAC setting.

A vehicle system for setting driver preference settings for a vehicle includes a plurality of antennas, a driver's door switch, a memory, a control unit, and at least two fobs. The plurality of antennas includes at least other closure antenna associated with a closure other than a driver's door. The at least one other closure antenna is configured to transmit an exterior search signal. The driver's door switch is for determining whether the driver's door is open or closed. The memory is for storing driver preference settings each associated with a different driver of the vehicle. The control until is in communication with the plurality of antennas, the driver's door switch, and the memory. The at least two fobs are configured to wirelessly communicate with the control unit via the plurality of antennas. The control unit is configured to determine whether a valid response signal was received in response to the transmitted exterior other closure search signal. The valid response signal includes a respective ID code unique to a respective fob of the at least two fobs that transmitted the valid response signal. The control unit is configured to determine whether a door switch flag allows for changing of a driver preference setting upon determining that a valid response signal was received. The door switch flag changes based on signals received from the driver's door switch. The control unit is further configured to assign a respective driver preference setting based on respective ID code in the received response signal upon determining that the door switch flag allows for changing the driver preference setting.

DETAILED DESCRIPTION

Figure 1:
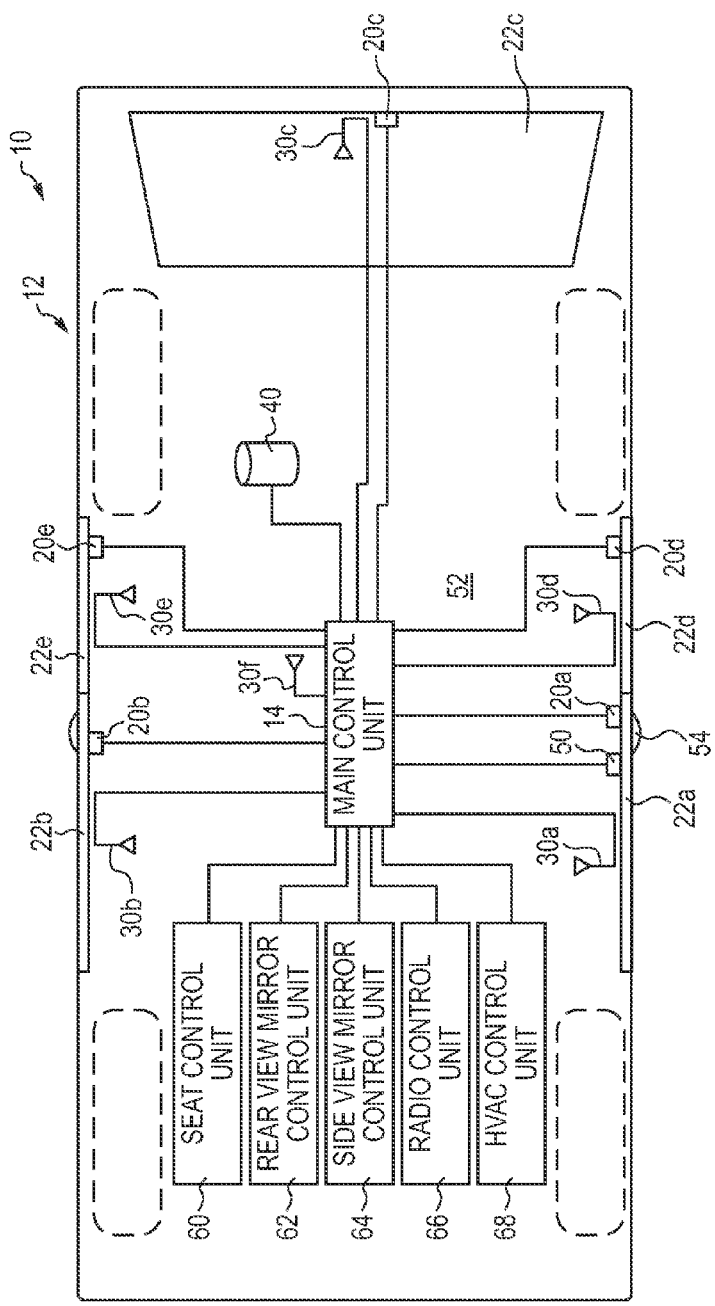
FIG. 1 is a schematic depiction of a vehicle system for setting driver preference settings for a vehicle.

FIG. 1 depicts a vehicle system 10 for setting driver preferences settings for a vehicle 12. The vehicle system 10 includes a main control unit 14, which can include hardware and/or software capable of performing operations that will be described in more detail below. The vehicle system 10 further includes a plurality of fobs 16a, 16b. The fobs 16a, 16b are configured to wirelessly communicate with the main control unit 14. The vehicle system 10 is capable determining driver preference settings in a manner such that the appropriate driver preference setting can be set for the driver of the vehicle. The vehicle system 10 can be part of a passive entry system where the operator of the vehicle 12 need not perform any active function, e.g., press a button on the fobs 16a, 16b, to gain access to the vehicle.

The main control unit 14 is in communication with a plurality of closure lock controllers, such as a driver's door lock controller 20a, a passenger's door lock controller 20b and a tailgate lock controller 20c. Each lock controller controls a respective lock for a respective closure. For example, the driver's door lock controller 20a controls a driver's door lock (not shown) for a driver's door 22a, the passenger's door lock controller 20b controls a passenger's door lock (not shown) for a passenger's door 22b and the tailgate lock controller 20c controls a tailgate lock (not shown) for the tailgate 22c of the vehicle. The passenger's door 22b depicted in FIG. 1 is shown on an opposite side of the vehicle 12 as the driver's door 22a. The vehicle 12 can also include a first rear passenger's door 22d rearward from the driver's door 22a on the same side of the vehicle as the driver's door 22a and a second rear passenger's door 22e rearward from the passenger's door 22b on the opposite side of the vehicle as the driver's door 22a. Door locks (not shown) and door lock controllers 20d, 20e, which can also be in communication with the main control unit 14, can also be associated with these other passenger's doors 22d and 22e, respectively. Each lock controller 20a, 20b, 20c, 20d and 20e, which can also be referred to as a closure lock controller, operates in a locked state, which places the respective closure lock in a locked position, and an unlocked state, which places the respective closure lock in an unlocked position.

The vehicle system 10 also includes a plurality of antennas 30a-30g. The main control unit 14 is in communication with each antenna 30a-30f. The plurality of antennas 30a-30f includes a driver's door antenna 30a, which can be located on or adjacent to the driver's door 22a of the vehicle 12. The plurality of antennas further includes a passenger's door antenna 30b located on or adjacent the passenger's door 22b, which is located on an opposite side of the vehicle as the driver's door and can typically be referred to as a front passenger's door. The plurality of antennas also includes a tailgate antenna 30c located on or adjacent to the tailgate 22c of the vehicle 12. The plurality of antennas also includes rear passenger door antennas 30d and 30e located on or near respective rear passenger doors 22d and 22e of the vehicle. The antennas 30a-30f that are associated with a respective closure are configured to transmit an exterior search signal to locate fobs near the respective closure and outside of the vehicle. The vehicle system 10 further includes an antenna 30f, which is configured to transmit an interior search signal to locate fobs within the vehicle. Although only one antenna 30f for transmitting an interior search signal is shown, multiple interior search antennas can be provided.

The plurality of antennas also includes a receiving antenna 30g in communication with the main control unit 14. The receiving antenna 30g is configured to receive response signals transmitted from the fobs 16a, 16b. The response signals are transmitted from the fobs 16a, 16b in response to receiving a search signal, which is transmitted from the antennas 30a-30g. The response signals can include an access code for changing the state of the lock controllers 20a-20e and an ID code unique to the fob that transmitted the response signal. The response signals can be RF transmissions. The search signals can be LF transmissions.

Figure 2:
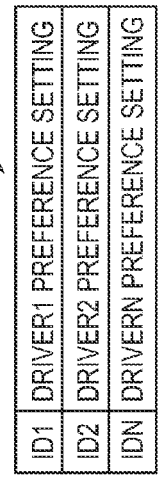
FIG. 2 is a schematic depiction of a table stored in a memory of the vehicle system depicted in FIG. 1.

The vehicle system 10 further includes a memory 40, which is in communication with the main control unit 14. FIG. 2 depicts a table 42, which can be stored in the memory 40. The memory 40 is for storing at least two driver preference settings, e.g., Driver1 Preference Setting, Driver2 Preference Setting, DriverN Preference Setting, each associated with a different driver of the vehicle. The driver preference settings and identifications shown in FIG. 2 can be stored in other manners that allow each different driver of the vehicle to be associated with a respective driver preference setting.

Each driver of the vehicle 12 typically carries his or her own fob 16a, 16b. Only fobs 16a, 16b are shown in FIG. 1; however, a greater number of fobs can be employed in the vehicle system 10. If greater than two fobs are provided, further identifications can be provided, which is denoted as IDN in table 42. With reference back to the embodiment illustrated in FIG. 1, each fob 16a, 16b can be associated with a unique identification. For example, a first fob 16a can be associated with ID1 (see table 42 in FIG. 2) and a second fob 16b can be associated with ID2. The fobs 16a, 16b can be similar to known fobs capable of transmitting signals to and receiving wireless signals from the vehicle. Moreover, the fobs 16a, 16b can be other wireless communication devices such as a mobile phone and other devices capable of transmitting wireless signals to and receiving wireless signals from the vehicle.

The vehicle system 10 further includes a plurality of door switches 50a-50e, which are each in communication with the main control unit 14. Each door switch 50a-50e is for determining whether the respective door is open or closed. For example, the driver's door switch 50a can send a signal to the main control unit 14, which allows the main control unit to determine whether the driver's door 22a has changed from open to closed. This allows for the changing of a door switch flag in a control routine, which will be described in more detail below. Each of the remaining door switches 50b-50e can send similar signals to the main control unit 14 for detecting whether the respective closure is open or closed.

The main control unit 14 is in communication with each closure lock controller 20a-20e, each antenna 30a-30g, the door switches 50a-50e and the memory 40. The main control unit 14 is configured to initiate a search signal from at least one of the antennas 30a-30e to locate at least one of the at least two fobs 16a, 16b located outside of and adjacent to the vehicle 12. The main control unit 14 is also configured to initiate a search signal from the antenna 30f to locate at least one of the at least two fobs 16a, 16b located inside the vehicle 12.

The main control unit 14 is also configured to assign a driver preference setting based on an ID code in a response signal transmitted from one of the fobs 16a, 16b. The response signal transmitted from each fob 16a, 16b includes the ID code that is unique to the particular fob. The main control unit 14 can assign the Driver1 Preference Setting when the ID code ID1 has been received in a response signal transmitted from the first fob 16a. The main control unit 14 can assign the Driver2 Preference Setting when the ID code ID2 has been received in a response signal transmitted from the second fob 16b. The main control unit 14 can assign the respective driver preference setting based on a received response signal even when this response signal is in response to a search signal transmitted from an antenna other than the driver's door antenna 30a, e.g., antennas 30b-30e.

The main control unit 14 is also configured to update and apply the appropriate assigned driver preference setting The driver preference setting includes at least one of a vehicle seat setting, a rear view mirror setting, a side view mirror setting, a radio station setting and an HVAC setting. FIG. 1 depicts the system 10 as including a seat control unit 60, a rear view mirror control unit 62, a side view mirror control unit 64, a radio control unit 66 and an HVAC control unit 68. Each control unit 60-68 is depicted as separate from and in communication with the main control unit 14. Each control unit 60-68, or at least one of the control units, could also be integrated into the main control unit 14. The seat control unit 60 controls the vehicle seat setting, e.g., by controlling movement of at least one of the seats (not shown) of the vehicle 12. The rear view mirror control unit 62 controls the rear view mirror setting, e.g., by controlling movement of the rear view mirror (not shown) of the vehicle 12. The side view mirror control unit 64 controls the side view mirror setting, e.g., by controlling movement of the side view mirror (not shown) of the vehicle 12. The radio control unit 66 controls the radio (not shown) of the vehicle, e.g., by controlling radio presets and the like. The HVAC control unit 68 controls the HVAC system (not shown) of the vehicle, e.g., by controlling HVAC presets and the like.

Figure 3:
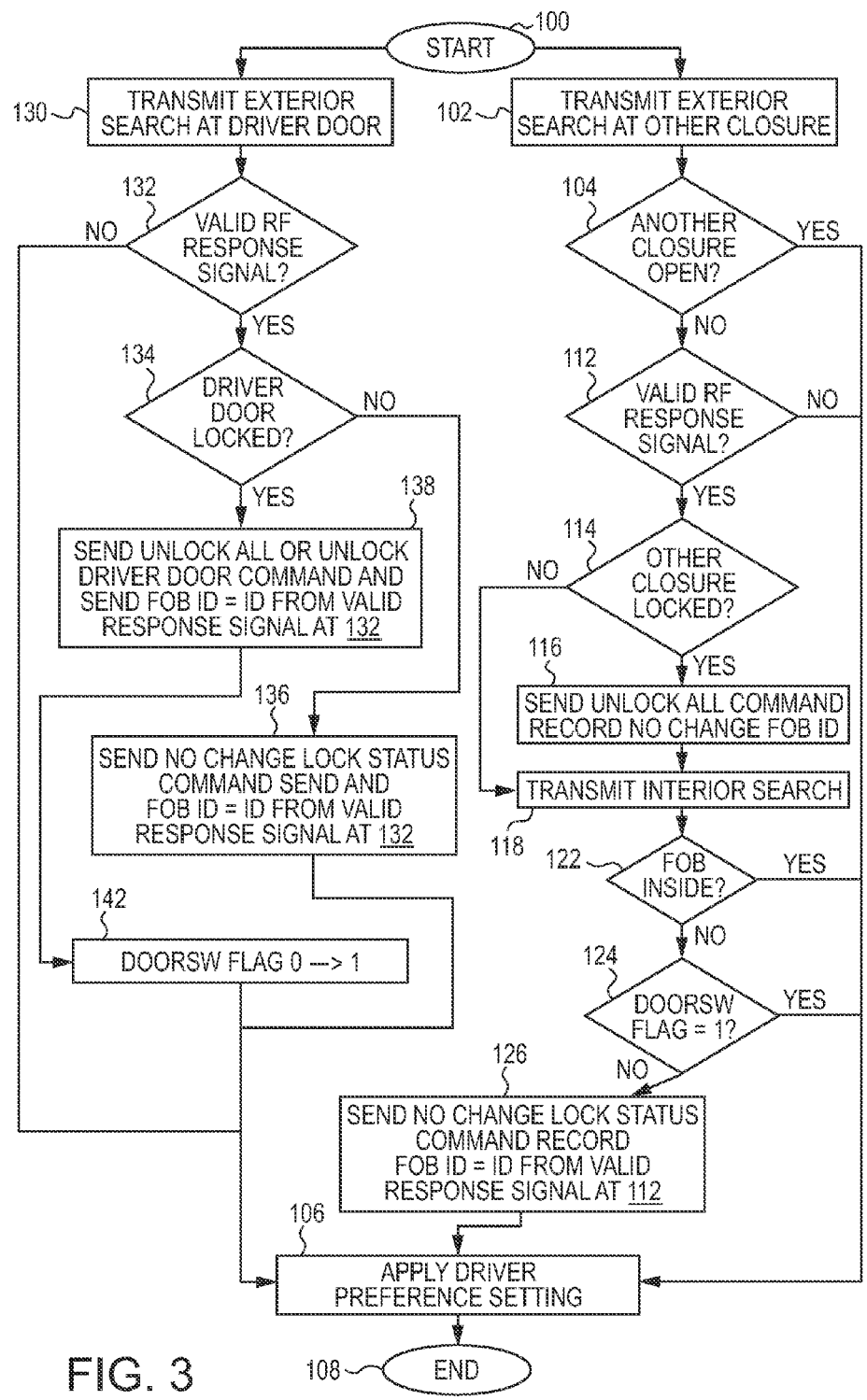
FIG. 3 is a flow diagram depicting a method for applying driver preference settings for a vehicle.
Figure 4:
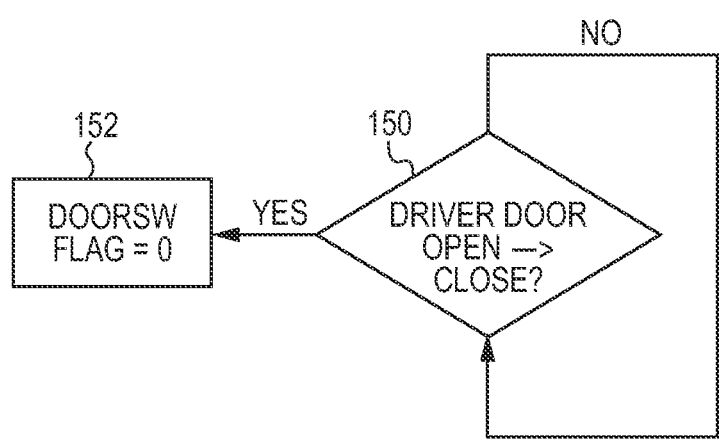
FIG. 4 is another routine run by the vehicle system for setting driver preference settings for the vehicle.

A method for applying driver preference settings for a vehicle will be described with reference to FIGS. 3 and 4. Even though FIGS. 3 and 4 depict steps in a logical order, the order in which the steps are performed should not be limited to the order in which they are presented in FIGS. 3 and 4 or the order in which they are described below. Additionally, the method for applying driver preference settings depicted in FIGS. 3 and 4 will be described with reference to the vehicle system 10 shown in FIG. 1; however, the method can be used with other similar vehicle systems. FIG. 3 depicts a control routine having two branches, and these branches can be performed simultaneously by software found in the main control unit 14. FIG. 4 also depicts a control routine that can operate simultaneously with the control routine depicted in FIG. 3.

With reference to FIG. 3, the method for applying driver preference settings begins at 100. At 100, the driver preference settings for the previous driver of the vehicle are applied by the control unit 14.

At 102, the exterior search signal is transmitted from at least one of the antennas 30b-30e that is associated with a closure of the vehicle 10 other than the driver's door 22a. As such, at 102, the main control unit 14 transmits an exterior other closure search signal from an antenna, e.g., antennas 30b-30e, not associated with the driver's door 22a.

At 104, the control unit 14 determines whether another closure other than the driver's door 22a (i.e., closures 22b-22e) is open. This can be determined by the door switches 50b-50e associated with each respective closure. If another closure other than the driver's door 22a is found to be open at 104, then the driver preference setting that was previously stored in the memory 40 is applied at 106 and the control routine ends at 108. If another closure is not found to be open, at 104, then the control unit 14 determines whether a valid RF response signal has been received in response to the transmitted exterior other closure search signal at 112.

If a valid RF response signal is not received at 112, then the driver preference setting that was stored in the beginning of the control routine at 100 is applied at 106 and the control routine ends at 108. If a valid RF response signal is received at 112, then the control unit 14 determines whether the other closure associated with the exterior search signal transmitted at 102 is locked at 114. For example, if the exterior other closure search signal was transmitted from the tailgate antenna 30c, at 114 the control unit 14 determines whether the tailgate 22c is locked based on an operating state of the tailgate lock controller 50c.

If it is determined that the other closure is locked at 114, then the control unit 14 sends a command to UNLOCK ALL closure locks 20a-20e associated with the respective closures and records a NO CHANGE to fob ID at 116. The UNLOCK ALL command at 116 is sent prior to the transmission of an interior search by the antenna 30f to allow the carrier of a fob associated with the vehicle to enter the vehicle during the transmission of the interior search. NO CHANGE in fob ID is recorded at this time, because the driver of vehicle may not be carrying the fob that sent the valid RF response signal at 112. With reference back to step 114, if the control unit 14 determines that the other closure is not locked, then the routine skips step 116 and proceeds to step 118 to transmit the interior search signal.

At 122, the control unit 14 determines whether a fob is located inside the vehicle based on receiving a response signal in response to the interior search transmitted at 118. The interior search signal is transmitted from the antenna 30g, for example. If it is determined that a fob is located inside the vehicle at 122, then the driver preference setting that was stored at 100 is applied at 106 and the control routine ends at 108. If, however, it is determined at 122 that a fob is not located inside the vehicle, the control unit 14 determines whether a door switch flag allows for changing the driver preference setting at 124. In the control routine depicted in FIG. 3, when the door switch flag is "1", then the door switch flag does not allow for change in the driver preference setting. When the door switch flag is "0", then the door switch flag does allow for changing the driver preference setting. As such, if it is determined at 124 that the door flag switch does not allow for change in the driver preference setting, then the driver preference setting that was stored at 100 is applied at 106 and the control routine ends at 108. If, however, at 124 it is determined that the door switch flag allows for changing the driver preference setting (i.e., the door switch flag is "0"), then at 126 a NO CHANGE LOCK STATUS command is sent from the main control unit 14 to the door lock controller 20a-20e and the fob ID from the valid response signal received at 112 is recorded. Afterwards, the driver preference setting associated with the fob ID from the valid response signal received at 112 is applied at 106 and the control routine ends at 108.

The control routine depicted in FIG. 3 also transmits an exterior search signal from the driver door antenna 30a. As mentioned above, this search signal, which can be referred to as an exterior driver's door search signal, can be transmitted simultaneously with the exterior other closure search signal, which is transmitted at 102. At 132, the control unit 14 determines whether a valid RF response signal is received in response to the exterior driver's door search signal that was transmitted at 130. If no valid RF response signal is received at 132, then the driver preference settings that were stored at 100 are applied at 106 and the control routine ends at 108. If a valid RF response signal is received at 132, then the main control unit 14 determines whether the driver door 22a is locked at 134.

The determination that the driver door is locked can be based on the state of the driver door lock controller 20a, which is in communication with the main control unit 14. If it is determined that the driver's door is not locked at 134, then a NO CHANGE LOCK STATUS command is sent to the closure lock controllers 20a-20e and the fob ID from the valid response signal received at 132 is recorded by the main control unit 14 at 136. After the fob ID from the fob that provided the valid RF signal at 132 is recorded at 136, the driver preference setting associated with that fob ID is applied at 106 and the control routine ends at 108. If it is determined that the driver door is locked at 134, then an UNLOCK ALL or a UNLOCK DRIVER DOOR command is sent. The UNLOCK ALL command would be sent to all closure lock controllers 20a-20e. The UNLOCK DRIVER DOOR command would be sent only to the driver door lock controller 20a. Whether the UNLOCK ALL command or the UNLOCK DRIVER DOOR command is sent can be based on preferences set by the driver of the vehicle. At 138, the fob ID associated with the valid response signal received at 132 is also recorded. The control routine then proceeds to change the door switch flag from 0 to 1, which results in the door switch flag to not allow the changing of the driver preference setting. The driver preference setting then associated with the fob ID in the valid response signal received at 132 is applied at 106 and the control routine ends at 108.

With reference to FIG. 4, the method for applying driver preference settings for a vehicle determines whether the driver door has moved from open to closed at 150. The determination as to whether the driver door 20*a* has moved from open to closed, results from a signal sent from the door switch 50*a*, which is associated with the driver door 22*a* and in communication with the control unit 14. When it is determined that the driver door changed from opened to closed, the door switch flag is changed to 0, at 152, which allows for changing the driver preference setting as described above with reference to FIG. 3.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for applying driver preference settings for a vehicle including a plurality of closures and a plurality of antennas, wherein the plurality of closures includes a driver's door and at least one other closure, wherein the plurality of antennas includes a driver's door antenna associated with the driver's door and at least one other closure antenna associated with the at least one other closure, the method comprising:
transmitting an exterior other closure search signal from the at least one other closure antenna;
determining whether a valid other closure response signal was received in response to the transmitted exterior other closure search signal, wherein the valid other closure response signal includes a respective ID code unique to a fob that transmitted the valid other closure response signal;
upon determining that a valid other closure response signal was received, determining whether a door switch flag allows for changing of a driver preference setting; and
upon determining that the door switch flag allows for changing the driver preference setting, assigning the driver preference setting based on the respective ID code in the received other closure response signal, wherein the assigned driver preference setting includes at least one of a vehicle seat setting, a rear view mirror setting, a side view mirror setting, a radio station setting and an HVAC setting.

2. The method of claim 1, further comprising:
transmitting an exterior driver's door search signal from the driver's door antenna;
determining whether a valid driver's door response signal was received in response to the transmitted driver's door search signal, wherein the valid driver's door response signal includes a respective ID code unique to a fob that transmitted the valid driver's door response signal;
upon determining that a valid driver's door response signal was received, assigning the driver preference setting based on the respective ID code in the valid driver's door response signal.

3. The method of claim 2, further comprising:
determining whether a closure other than the at least one other closure is open; and
upon determining that a closure other than the at least one other closure is open, no change to the driver preference setting is applied.

4. The method of claim 2, further comprising:
sending an unlock command to a plurality of closure lock controllers after receiving a valid other closure response signal; and
determining whether a fob is located in the vehicle.

5. The method of claim 4, further comprising:
upon determining that a fob is located in the vehicle, no change to the driver preference setting is applied; and
upon determining that a fob is not located in the vehicle, determining whether the door switch flag allows for changing of a driver preference setting.

6. The method of claim 2, further comprising:
determining whether the driver's door has changed from open to closed; and
upon determining that the driver's door has changed from open to closed, changing the door switch flag to allow for changing of the driver preference setting.

7. The method of claim 2, further comprising:
determining whether the driver's door is locked; and
upon determining that the driver's door is locked, updating the door switch flag to not allow for changing of the driver preference setting.

8. The method of claim 1, further comprising:
determining whether a closure other than the at least one other closure is open; and
upon determining that a closure other than the at least one other closure is open, no change to the driver preference setting is applied.

9. The method of claim 1, further comprising:
sending an unlock command to a plurality of closure lock controllers after receiving a valid other closure response signal; and
determining whether a fob is located in the vehicle.

10. The method of claim 9, further comprising:
upon determining that a fob is located in the vehicle, no change to the driver preference setting is applied; and
upon determining that a fob is not located in the vehicle, determining whether the door switch flag allows for changing of a driver preference setting.

11. A vehicle system for setting driver preference settings for a vehicle, the system comprising:
a plurality of antennas including at least one other closure antenna associated with a closure other than a driver's door, wherein the at least one other closure antenna is configured to transmit an exterior other closure search signal;
a driver's door switch for determining whether the driver's door is open or closed;
a memory for storing driver preference settings each associated with a different driver of the vehicle; and
a control unit in communication with the plurality of antennas, the driver's door switch and the memory; and
at least two fobs configured to wirelessly communicate with the control unit via the plurality of antennas,
wherein the control unit is configured to determine whether a valid other closure response signal was received in response to the transmitted exterior other closure search signal, wherein the valid other closure response signal includes a respective ID code unique to a respective fob of the at least two fobs that transmitted the valid other closure response signal;
wherein the control unit is configured to determine whether a door switch flag allows for changing of a driver preference setting upon determining that a valid other closure response signal was received, wherein the door switch flag changes based on signals received from the driver's door switch; and wherein the control unit is configured to assign a respective driver preference setting based on the respective ID code in the received other closure response signal upon determining that the door switch flag allows for changing the driver preference setting.

12. The system of claim 11, wherein the assigned driver preference setting includes at least one of a vehicle seat setting, a rear view mirror setting, a side view mirror setting, a radio station setting and an HVAC setting.

13. The system of claim 11, wherein the plurality of antennas includes a driver's door antenna for transmitting an exterior driver's door search signal;

wherein the control unit is further configured to determine whether a valid driver's door response signal was received in response to the transmitted driver's door search signal, wherein the valid driver's door response signal includes a respective ID code unique to a respective fob of the at least two fobs that transmitted the valid driver's door response signal;

wherein the control unit is further configured to assign the driver preference setting based on the respective ID code in the valid driver's door response signal upon determining that a valid driver's door response signal was received.

14. The system of claim 11, further comprising a plurality of closure switches each associated with a respective closure for determining whether the respective closure is open or closed, wherein the control unit is further configured to determine whether any closure is open; and wherein the control unit is further configured to apply no change to the driver preference setting upon determining that any closure is open.

15. The system of claim 11, further comprising a plurality of closure lock controllers each associated with a respective closure lock, wherein the control unit is further configured to send an unlock command to the plurality of closure lock controllers after receiving a valid other closure response signal.

16. The system of claim 11, wherein the plurality of antennas includes an additional antenna for transmitting a search signal to locate a fob in the vehicle, wherein the control unit is further configured to apply no change to the driver preference setting upon determining that a fob is located in the vehicle after receiving a valid other closure response signal.

17. The system of claim 16, wherein the control unit is further configured to determine whether the door switch flag allows for changing of a driver preference setting upon determining that a fob is not located in the vehicle after receiving a valid other closure response signal.

18. The system of claim 11, wherein the control unit is further configured to determine whether the driver's door has changed from open to closed based on a signal received from the driver's door switch.

19. The system of claim 18, wherein the control unit is further configured to update the door switch flag to allow for changing of the driver preference setting upon determining that the driver's door has changed from open to closed.

20. The system of claim 11, further comprising a driver's door lock controller in communication with the main control unit, wherein the control unit is further configured to update the door switch flag to not allow for changing of the driver preference setting based on determining that the driver's door is locked, which is determined based on a signal sent to or received from the driver's door lock controller.

* * * * *